United States Patent [19]

Simonsson

[11] 4,199,838

[45] Apr. 29, 1980

[54] INDICATING DEVICE FOR VACUUM CLEANERS

[75] Inventor: Sven B. Simonsson, Tyreso, Sweden

[73] Assignee: Aktiebolaget Electrolux, Stockholm, Sweden

[21] Appl. No.: 941,241

[22] Filed: Sep. 11, 1978

[30] Foreign Application Priority Data

Sep. 15, 1977 [SE] Sweden .................................. 7710316

[51] Int. Cl.² .............................................. A47L 9/28
[52] U.S. Cl. ........................................ 15/339; 55/274; 73/717
[58] Field of Search ................... 15/339; 116/114 AD; 55/274

[56] References Cited

U.S. PATENT DOCUMENTS

| | | | |
|---|---|---|---|
| 3,172,743 | 3/1965 | Kowalewski | 55/274 X |
| 3,177,635 | 4/1965 | Cawl et al. | 55/274 |
| 3,587,515 | 6/1971 | Anderson | 15/339 X |
| 4,021,879 | 5/1977 | Brigham | 15/319 |
| 4,100,878 | 7/1978 | Leinfelt | 15/339 X |

Primary Examiner—Christopher K. Moore
Attorney, Agent, or Firm—Alfred E. Miller

[57] ABSTRACT

An indicating device for a vacuum cleaner having means which operates as a result of the pressure difference between the inside of a filter dust container and the outside thereof and is provided with means for communicating the degree of clogging of the dust container through a signalling device in the form of a light source or light sources that gives a visual indication of the amount of clogging of the paper dust container.

6 Claims, 3 Drawing Figures

INDICATING DEVICE FOR VACUUM CLEANERS

BACKGROUND OF THE INVENTION

It is known to have an indicating device on a vacuum cleaner which senses the pressure differential between the inside and the outside of a dust container. This pressure differential acts upon movable or rotatable devices, such as pistons, rollers or the like, and these constructions often have large space requirements and are furthermore expensive to manufacture and to assemble because of the high accuracy requirements of manufacture and assembly of such devices. These requirements are necessary in order to insure satisfactory results of these indicating devices in vacuum cleaners.

In order to eliminate the space and cost requirements of the previous, known devices, the present invention resides in the fact that the spaces on the inside and outside respectively of the dust container are connected to a plurality of light sources which are activated as a direct result of sensing the pressure differential between the inside and outside of said dust container. Thus, the number of light sources which are burning, or not burning, respectively, is an indication of the degree of clogging of the dust container. The invention may reside in the plurality of light sources or, on the other hand, in a single light source and a plurality of light pipes which are irradiated, or not irradiated, depending on the position of a movable shutter.

In order that the invention will be more clearly understood, it will now be disclosed in greater detail with reference to the accompanying drawings, in which.

DESCRIPTION OF THE PREFERRED EMBODIMENTS

Figure 1:
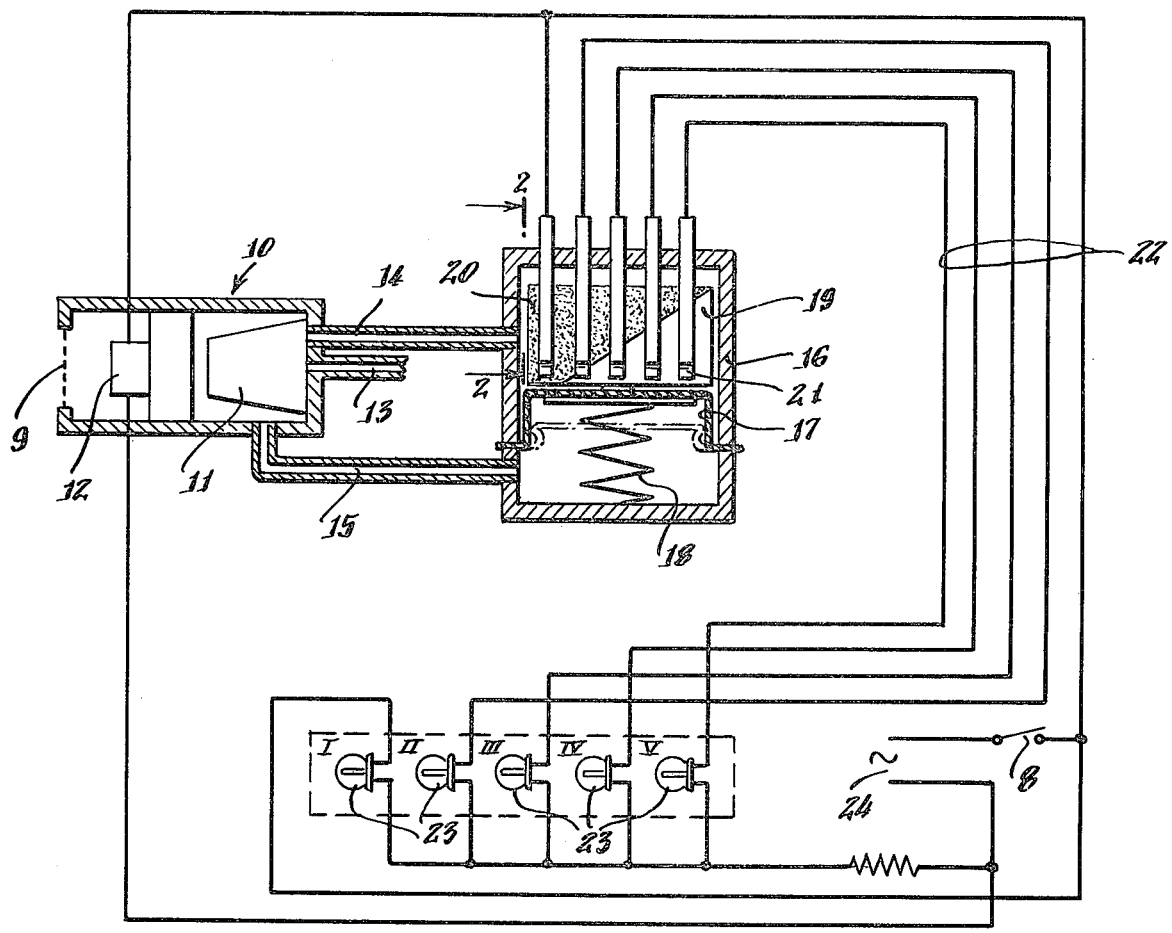
FIG. 1 is a schematic view of an indicating device constructed and arranged according to the teachings of the present invention and showing the indicating means in its initial position, that is, after a new dust container has been inserted in the vacuum cleaning apparatus.

Referring to FIG. 1, the vacuum cleaner is shown diagrammatically and is referred to by the numeral 10 and encloses a dust container 11, as well as a motor-fan unit 12. The air containing dust or dirt is sucked or drawn into the vacuum cleaner 10 by means of an inlet conduit 13 that is connected to a vacuum cleaner wand (not shown). The dust-ladened air is drawn into the dust container 11 and leaves behind the dust and dirt in the dust container while the air passes through the motor-fan unit 12 and leaves the vacuum cleaner through an outlet grate 9. Two tubes 14 and 15 connect the inner and outer spaces respectively of the dust container 11 and are joined to an indicating device which, for the sake of clarity, is shown on a larger scale. The indicating device includes a closed casing or housing 16. A diaphragm 17 is attached by its peripheral edges to the side walls of the housing 17. Thus, the diaphragm 16 divides the casing or housing 16 into two halves, whereby the upper half communicates with the inside of the dust container by means of the tube 14 and the lower part communicates with the outside of the dust container by means of the tube 15. Furthermore, a compression spring 18 is arranged between the diaphragm 17 and the portion of casing 16 that communicates with the outside of the dust container through the tube 15.

Figure 2:
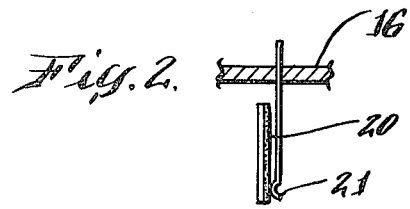
FIG. 2 is an enlarged section of a detail of construction takes on lines 2—2 of FIG. 1.

In the upper portion of the casing 16, and above the diaphragm 17, a contact surface 19 is shown which is in the shape of a triangle and is fabricated of electrically insulated material. An angle-shaped member is shown in FIG. 1 directly above the insulated contact surface 19, and is in the form of an electrically conducting copper layer 20, or an electrically conductive circuit making member. As seen in FIGS. 1 and 2, a plurality of curved contacts 21 are arranged in the casing 16 above the diaphragm 17 and wires 22 are connected to a plurality of lamps 23 at one end and the contacts 21 at the other end thereof. The lamps 23 are mounted in a panel which is visible from the outside of the vacuum cleaner, and is shown in FIG. 1 by dashed lines. Thus, by means of the switch 8 connected to the mains voltage the circuit can be connected to the power supply, thus providing current for light sources 23.

The present indicating device operates in the following manner. After the switch 8 has been closed, the motor-fan unit 12 becomes operative and air is drawn in or sucked through the inlet conduit 13, the dust container 11 and thereafter through the motor-fan unit 12 to the atmosphere through the grate 9. When the dust container becomes more and more clogged, the degree of clogging results in a continuous pressure differential between the inside and outside, respectively of the dust container. Obviously, this pressure difference will increase and because of this, the diaphragm 17 is moved against the force of the spring 18 downwardly as shown in FIG. 1 by dashed lines and simultaneously the insulated contact surface 19 connected to the diaphragm will also be moved downwardly so that gradually more and more of the contacts 21 will be closed by the copper layer 20 and therefore more of the lamps 23 will be lit in sequence. This sequential lighting of the lamps 23 gives an indication of the degree of clogging of the dust container 11. As seen in FIG. 1, it should be noted that the lamp designated by (I) is connected to the current circuit of the motor-fan unit so that the lamp (I) is turned on as soon as the switch 8 has been closed. Consequently, lamp (I) is on as long as the motor-fan unit is in operation. If lamps I, II, III, IV and V are lit, the dust bag is completely filled and should be replaced immediately.

Figure 3:
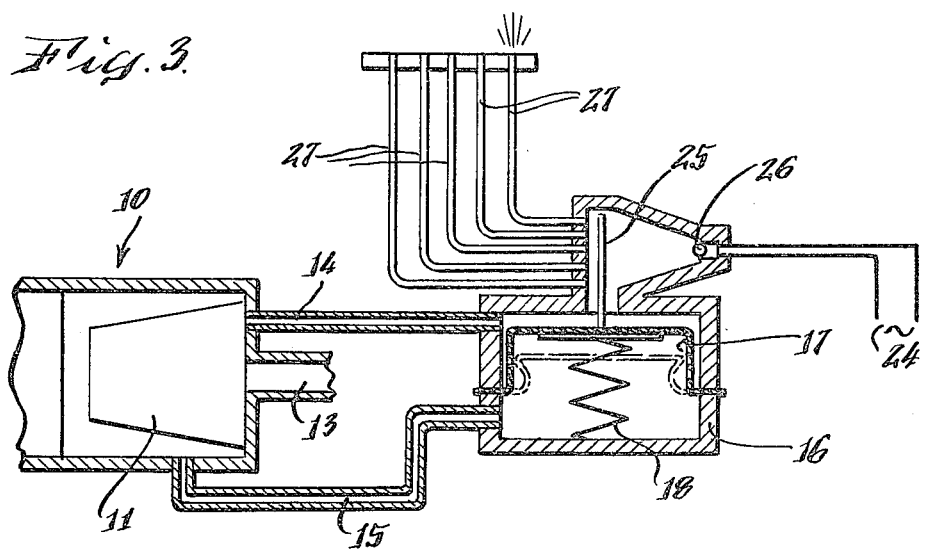
FIG. 3 is a schematic view of another embodiment of the invention.

Referring to FIG. 3, another embodiment of the invention is shown in which the contact surfaces 19 and 20 of the first embodiment of the invention has been replaced by a screen or shutter 25 secured to the upper side of the diaphragm 17 and disposed at right angles thereto. This screen is arranged between a light source 26 and a plurality of light transmitters 27, which are in the form of fiber optic tubes, and of which the light transmitting capacity is well known.

When the dust container becomes increasingly clogged, the diaphragm 17 moves against the force of spring 18 downwardly and, as a consequence, the inlet openings to the light transmitters 27 are gradually uncovered for the light coming from the light source 26 as the screen 25 descends. Thus, the outlet ends of the light transmitter 27 provide an indication of the clogging degree of the dust container 11, said light indication being in sequence and visible from the outside of the vacuum cleaner 10.

It is not intended to be limited by what is described and shown herein, since several modifications are possible within the scope of the claims of the invention. For example, instead of lighting lamps, all the lamps can be lit initially and when the dust container becomes increasingly clogged, this can be indicated by sequentially turning off the lamps.

What is claimed is:

1. In a vacuum cleaner having a dust container therein and a casing provided with means movable under the influence of a varying pressure differential and dividing said casing into two parts, first means communicating between the space on the upstream side of said dust container and one part of said casing, second means communicating between the space on the downstream side of said dust container and the other part of said casing, the invention comprising: an indicating device in the form of a plurality of light sources visible from the outside of said vacuum cleaner showing the degree of clogging of said dust container, a plurality of corresponding electric circuits for said light sources, said movable means having an electrically conductive circuit making member for sequentially closing each of said electric circuits to light the respective light source in response to said movable means moving under the influence of an increasing pressure differential between said first means on the upstream side and said second means on the downstream side of said dust container, said plurality of light sources thereby being lit in a sequential manner as a visual indication of the amount of clogging of the dust container.

2. An indicating device as claimed in claim 1 wherein said casing is closed and said movable means in said casing is a diaphragm.

3. An indicating device as claimed in claim 2 wherein the peripheral edge of said diaphragm is secured to the inner wall of said casing dividing said casing into said two parts.

4. An indicating device as claimed in claim 3 further comprising a compression spring mounted in said one part of said casing communicating with the downstream side of said dust container and normally biasing said diaphragm toward the other of said two parts, said diaphragm being mounted for movement in said casing depending on the increase in pressure differential between the upstream and downstream sides of said dust container resulting from the increasing clogging of the dust container and against the force of said compression spring.

5. In a vacuum cleaner having a dust container therein and a casing provided with means movable under a pressure differential, a first tube communicating between the space on the upstream side of said dust container and said casing and a second tube communicating between the space on the downstream side of said dust container and said casing, the invention comprising: an indicating device visible from the outside of said vacuum cleaner showing the degree of clogging of said dust container, said casing being closed and said movable means being a diaphragm attached by its peripheral edge to the inner wall of said casing dividing the latter into two parts, said first tube connecting one part of said casing to the space on the upstream side of said dust container and said second tube connecting the other part of said casing to the space on the downstream side of the dust container, a compression spring arranged in the other part of said casing and having one end secured to one side of said diaphragm while the other end is secured to said casing, a screen secured to the other side of said diaphragm in said one part of said casing, a light source adjacent to one side of said screen, a plurality of light transmitters adjacent to the other side of said screen and to each other and connected to said indicating device, said screen being in a position to block the irradiations of any of said light transmitters by said light source, said diaphragm when moved against the action of said compression spring and under the influence of an increasing pressure differential between the space on the upstream side of the dust container and the space on the downstream side of the dust container causing said screen to move to sequentially unblock said light transmitters to thereby allow said light source to sequentially irradiate said light transmitters that are connected to said indicating device.

6. An indicating device as claimed in claim 5 wherein said light transmitters are fiber optic pipes having closely spaced inlets during said increased clogging of said dust container the inlets to said pipes are sequentially uncovered when said screen moves with the diaphragm to thereby project light to said indicating device for a visible showing of the amount of clogging of the dust container.

* * * * *